United States Patent
Vehra et al.

(10) Patent No.: US 10,539,013 B2
(45) Date of Patent: Jan. 21, 2020

(54) SYSTEM AND METHOD FOR MULTI-FREQUENCY DOWNHOLE BUS COMMUNICATION

(71) Applicant: Halliburton Energy Services, Inc., Houston, TX (US)

(72) Inventors: Imran Sharif Vehra, Kingwood, TX (US); Zinovy B. Krugliak, Houston, TX (US); Matthew Chase Griffing, Kingwood, TX (US); Clint Paul Lozinsky, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/330,326

(22) PCT Filed: Jun. 26, 2017

(86) PCT No.: PCT/US2017/039285
§ 371 (c)(1),
(2) Date: Mar. 4, 2019

(87) PCT Pub. No.: WO2019/004999
PCT Pub. Date: Jan. 3, 2019

(65) Prior Publication Data
US 2019/0226332 A1 Jul. 25, 2019

(51) Int. Cl.
*E21B 49/00* (2006.01)
*H04L 5/00* (2006.01)
(Continued)

(52) U.S. Cl.
CPC ............ *E21B 49/00* (2013.01); *E21B 47/124* (2013.01); *G06F 13/00* (2013.01); *H04L 5/0003* (2013.01);
(Continued)

(58) Field of Classification Search
CPC ........ E21B 49/00; E21B 47/12; E21B 47/122; E21B 47/124; E21B 47/18; G06F 13/00;
(Continued)

(56) References Cited

U.S. PATENT DOCUMENTS

| | | | | |
|---|---|---|---|---|
| 7,303,007 | B2 * | 12/2007 | Konschuh | E21B 4/02 166/250.01 |
| 2005/0104743 | A1 * | 5/2005 | Ripolone | G01V 11/002 340/855.1 |

(Continued)

OTHER PUBLICATIONS

International Search Report and Written Opinion dated Dec. 18, 2017; International PCT Application No. PCT/US2017/039285.

*Primary Examiner* — Franklin D Balseca
(74) *Attorney, Agent, or Firm* — McGuireWoods LLP

(57) ABSTRACT

A bottom hole assembly includes a single wire bus, a legacy sensor coupled to the single wire bus, and at least one high frequency communication sensor coupled to the single wire bus. The high frequency communication sensor injects a high frequency signal alternating between high frequency synchronization pulses and high frequency data signals onto the single wire bus. A first high frequency pass filter coupled between the at least one high frequency communication sensor and the single wire bus is also included. The high frequency pass filter passes the high frequency signal to the single wire bus from the high frequency communication sensor. The bottom hole assembly includes a first high frequency blocking filter coupled between the legacy sensor and the single wire bus. The high frequency blocking filter blocks the high frequency signal from the high frequency communication sensor from disturbing a legacy signal at the legacy sensor.

15 Claims, 4 Drawing Sheets

(51) Int. Cl.
   *G06F 13/00*   (2006.01)
   *E21B 47/12*   (2012.01)
   *H04L 12/40*   (2006.01)
   *H04L 25/03*   (2006.01)
   *E21B 47/18*   (2012.01)

(52) U.S. Cl.
   CPC ........ *H04L 12/40* (2013.01); *H04L 25/03828* (2013.01); *E21B 47/12* (2013.01); *E21B 47/122* (2013.01); *E21B 47/18* (2013.01)

(58) Field of Classification Search
   CPC .. H04L 5/0003; H04L 12/40; H04L 25/03828
   See application file for complete search history.

(56) References Cited

U.S. PATENT DOCUMENTS

| | | |
|---|---|---|
| 2011/0251813 A1 | 10/2011 | Coman et al. |
| 2012/0163523 A1 | 6/2012 | Tang |
| 2014/0192621 A1 | 7/2014 | Ram et al. |
| 2014/0311804 A1 | 10/2014 | Gadot et al. |
| 2014/0354446 A1 | 12/2014 | Nakayama et al. |
| 2017/0059637 A1* | 3/2017 | Santoso ................... H02H 7/16 |

\* cited by examiner

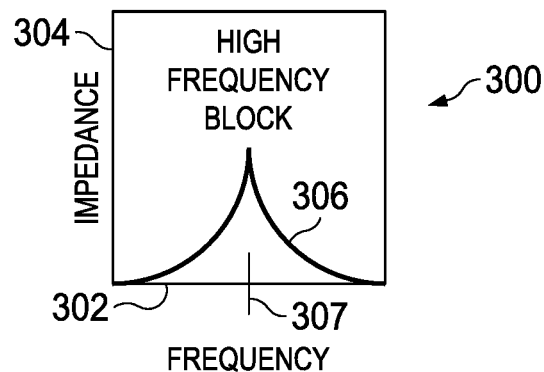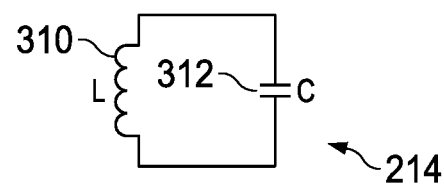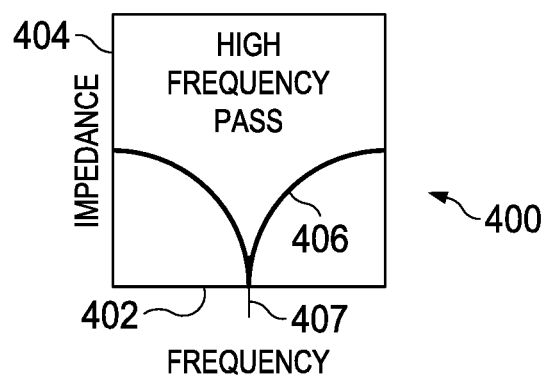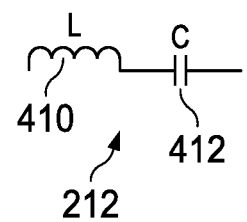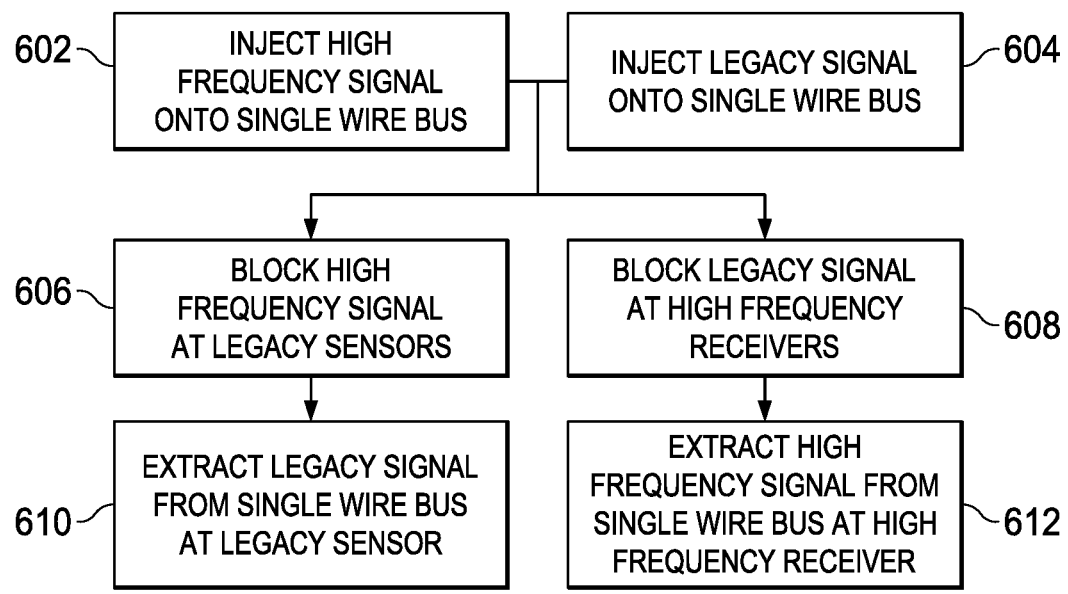

SYSTEM AND METHOD FOR MULTI-FREQUENCY DOWNHOLE BUS COMMUNICATION

BACKGROUND

The present disclosure relates generally to sensor communication during wellbore measurements, and more specifically to providing sensor communication at a new frequency along a single wire bus within a bottom hole assembly that does not interfere with operation of legacy sensors positioned along the bus.

During drilling and survey operations within a well, the single wire bus is used for communication between tools positioned along the single wire bus and for sharing power between the tools positioned along the single wire bus. Legacy sensors, which are tools currently positioned along the single wire bus, generally communicate using a legacy single wire protocol based on MIL-STD-1553 standard for electrical characteristics of a data bus. Communications between several of the legacy sensors along the single wire bus using the legacy single wire protocol may result in congested transmissions along the single wire bus and a loss of communication precision. Additionally, communication using the legacy single wire protocol may not be compatible with other sensors that rely on different standards for data transmission across the single wire bus.

BRIEF DESCRIPTION OF THE DRAWINGS

Illustrative embodiments of the present disclosure are described in detail below with reference to the attached drawing figures, which are incorporated by reference herein, and wherein:

FIG. 3A is a chart illustrating operation of a high frequency blocking filter;

FIG. 3B is a schematic diagram of the high frequency blocking filter of the chart of FIG. 3A;

FIG. 4A is a chart illustrating operation of a high frequency pass filter;

FIG. 4B is a schematic diagram of the high frequency pass filter of the chart of FIG. 4A;

FIG. 6 is a flow chart of a method for multi-frequency communication across the single wire bus of FIG. 5.

Figure 1:
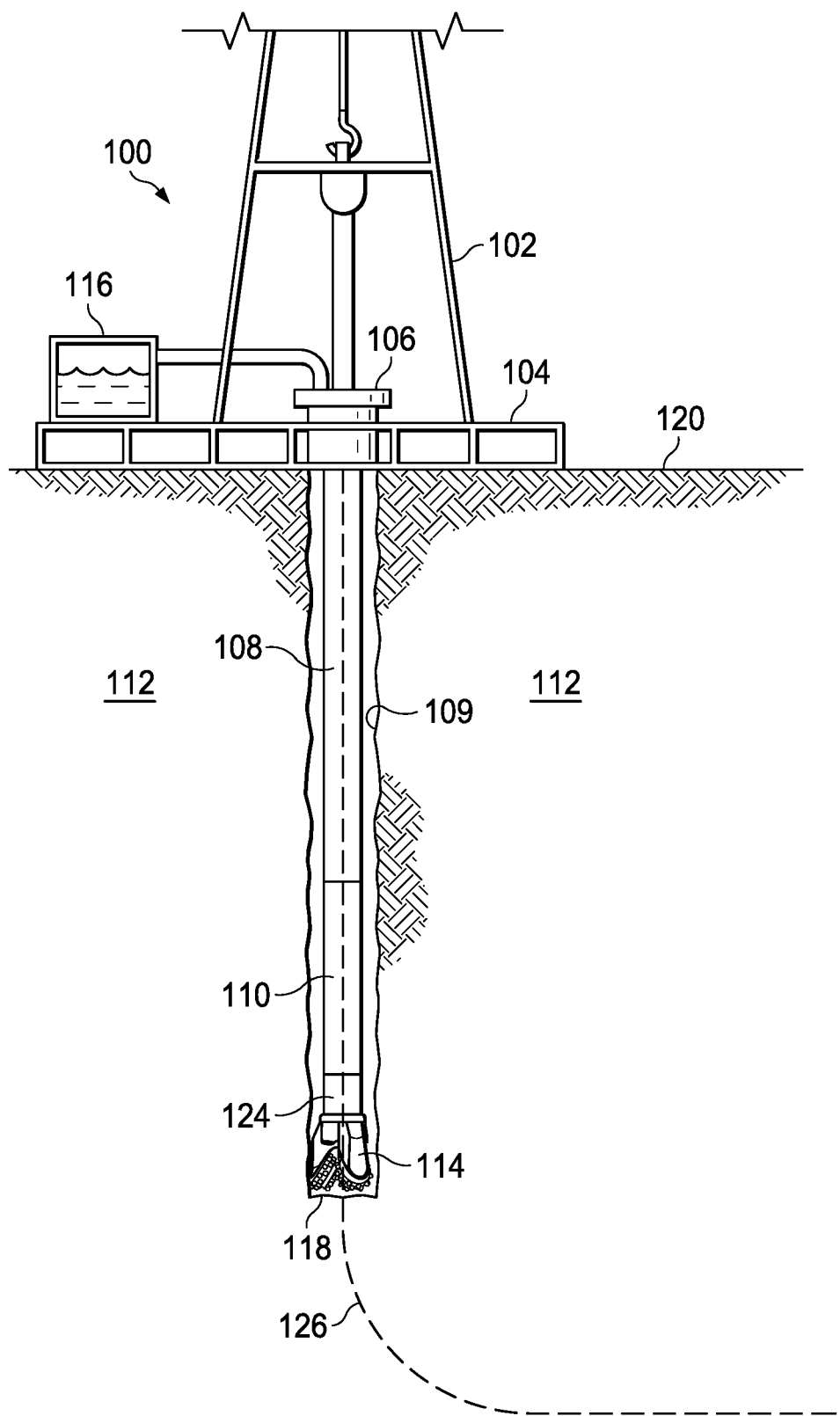
FIG. 1 is a schematic view of a drilling system within a well.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the disclosed subject matter, and it is understood that other embodiments may be utilized and that logical structural, mechanical, electrical, and chemical changes may be made without departing from the spirit or scope of the disclosure. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

The present disclosure relates generally to sensor communication during wellbore measurements. More particularly, the present disclosure relates to providing sensor communication at a new frequency along a single wire bus within a bottom hole assembly that does not interfere with operation of legacy sensors positioned along the single wire bus (e.g., legacy sensor communication). The presently disclosed embodiments may be used in horizontal, vertical, deviated, or otherwise nonlinear wellbores in any type of subterranean formation. Embodiments may include sensors and legacy sensors of varying ranges and types to provide an accurate position of a drill bit while drilling a wellbore and an accurate reading of formation characteristics near the drill bit while surveying a formation surrounding the wellbore.

Referring to FIG. 1, a schematic view of a drilling system 100 is illustrated. The drilling system 100 includes a derrick 102 that is buttressed by a derrick floor 104. The derrick floor 104 supports a rotary table 106 that is driven during drilling at a desired rotational speed, for example, via a chain drive system through operation of a prime mover (not shown). The rotary table 106, in turn, provides the rotational force to a drill string 108 within a wellbore 109. The drill string 108, as illustrated, is coupled to a bottom hole assembly (BHA) 110. As described in detail below with reference to FIG. 2, the BHA 110 includes sensors and legacy sensors positioned along a single wire bus to take survey measurements of a formation 112 and positioning measurements of a drill bit 114.

The drilling system 100 also includes a drilling fluid reservoir 116. The drilling fluid reservoir 116 provides drilling fluid (e.g., drilling mud) through the drill string 108 to the BHA 110. The drilling fluid may continuously circulate through drill string 108, to an end 118 of the wellbore 109, and back to a surface 120. Further, the drilling fluid provides hydrostatic pressure that prevents formation fluids from entering into the wellbore 109, keeps the drill bit 114 cool and clean, and carries out drill cuttings during a drilling process. When a drilling motor is present within a steering system 124 between the BHA 110 and the drill bit 114, the flow of drilling fluid through the drill string 108 generates power at the BHA 110. In some embodiments, the power generated at the drilling motor provides power to the BHA 110. While the drilling motor is described as a part of the steering system 124 positioned between the BHA 110 and the drill bit 114, the drilling motor may be positioned anywhere along the drill string 108 sufficient to provide power to downhole tools of the drilling system 100.

In an embodiment, the steering system 124 is positioned in close proximity to the drill bit 114. The steering system 124 provides steering control to the drill bit 114 in addition to the drilling motor functions described above. For example, a target path 126 is programmed into the steering system 124 prior to commencing a drilling operation of the wellbore 109. The target path 126 may be embodied as instructions stored in a memory of the steering system 124, and a processor of the steering system 124 executes the instructions to control the direction of drilling by the drill bit 114. Sensors within the BHA 110 or the legacy sensors provide survey data to the steering system 124 during drilling operations that provides an indication of a location of the drill bit 114 during the drilling process. The steering system 124 uses this data to maintain the drill bit 114 on the target path 126 or to realign the drill bit 114 to the target path 126 when the steering system 124 receives an indication that the drill bit 114 has drifted from the target path 126.

Figure 2:
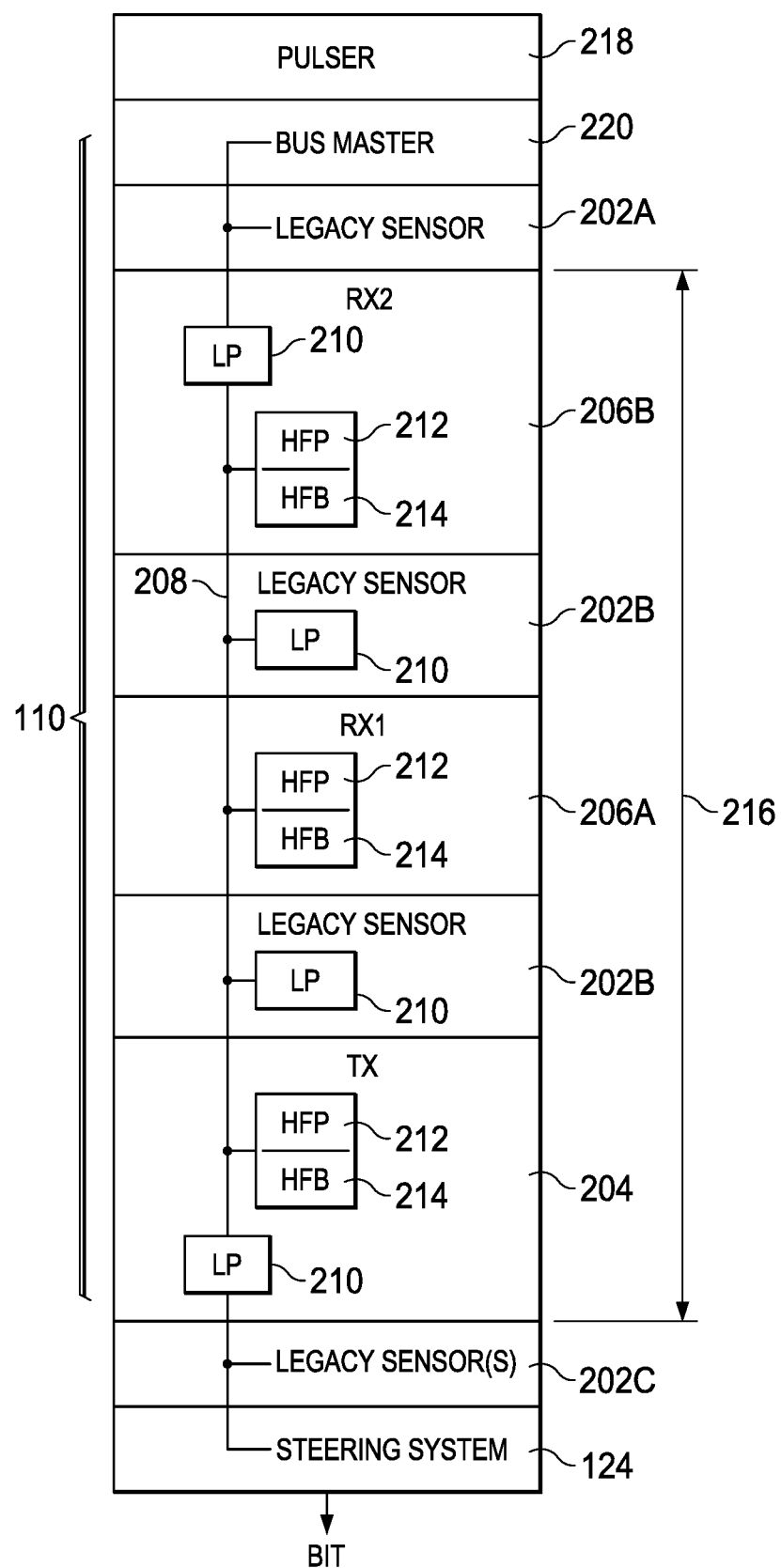
FIG. 2 is a schematic view of a bottom hole assembly of the drilling system of FIG. 1.

FIG. 2 is a schematic view of the BHA 110 and the steering system 124 of the drilling system 100. In an embodiment, the BHA 110 includes one or more legacy sensors 202, one or more deep reading resistivity tool transmitters 204, and one or more deep reading resistivity tool receivers 206A and 206B positioned along a single wire bus 208 of the BHA 110. The legacy sensors 202, the deep reading resistivity tool transmitters 204, and the deep reading resistivity tool receivers 206 may include accelerometers, gyroscopes, magnetometers, resistivity tools, and any other downhole tools that, when used in varying combinations, provide an indication of the location of the drill bit 114 and characteristics of the formation 112 surrounding the wellbore 109 at a position of the BHA 110.

The legacy sensors 202 communicate across the single wire bus 208 using a legacy single wire protocol based on a MIL-STD-1553 standard for bus communication. The legacy single wire protocol is a protocol for communication between legacy sensors 202 (i.e., tools currently implemented on a bottom hole assembly) positioned along the single wire bus 208. The communication over the single wire bus 208 under the legacy single wire protocol involves communication using square waves at a frequency within an order of magnitude of 200 kHz. The single wire bus 208 also provides power to the legacy sensors 202. As used herein, the term "legacy sensor" may refer to any sensor positioned along the single wire bus 208 that communicates along the single wire bus 208 at a different frequency than the deep reading resistivity tool transmitters 204, the deep reading resistivity tool receivers 206, and/or deep reading resistivity transceivers (not shown) (e.g., at a different frequency than high frequency communication sensors).

Upon implementing the deep reading resistivity tool transmitters 204, the deep reading resistivity tool receivers 206, and/or deep reading resistivity tool transceivers (not shown), which may collectively be referred to as high frequency communication sensors, along the single wire bus 208, the single wire bus 208 is able to provide an additional physical layer for communication between the deep reading resistivity tools 204 and 206 and provide power for the deep reading resistivity tools 204 and 206. As used herein, the term "high frequency" may refer to a communications frequency that is more than approximately 5 times greater than the frequency of a legacy signal of the legacy sensors 202. In operation, the deep reading resistivity tool transmitter 204 and the deep reading resistivity tool receivers 206 may communicate with each other using a signal with a frequency that is an order of magnitude greater than the frequency of legacy signals used by the legacy sensors 202 (e.g., an order of magnitude greater than 200 kHz). In an embodiment, the deep reading resistivity tool transmitter 204 may provide communication signals to the deep reading resistivity tool receivers 206 in a master-slave configuration. As an example of the deep reading resistivity tool communication signal, the deep reading resistivity tool transmitter 204 and the deep reading resistivity tool receivers 206 communicate across the single wire bus 208 at a tone of interest of 1 MHz. The deep reading resistivity tool signal provided by the deep reading resistivity tool transmitter 204 and the deep reading resistivity tool receivers 206 may be a pure tone sine wave with very little harmonics. Using the deep reading resistivity tool signal, a half-duplex communication along the single wire bus 208 is achieved between the deep reading resistivity tool transmitter 204 and the deep reading resistivity tool receivers 206. While the deep reading resistivity tool transmitter 204, the deep reading resistivity tool receivers 206, and the deep reading resistivity transceivers are collectively referred to as "communication sensors" or "high frequency communication sensors," it may be appreciated by those skilled in the art that the "communication sensors" are defined as sensors that are capable of communicating across the single wire bus 208 at a frequency greater than the frequency of legacy signals used by the legacy sensors 202 for legacy sensor communication.

To prevent the lower frequency communication between the legacy sensors 202 from interfering with the higher frequency communication between the deep reading resistivity tool transmitter 204 and the deep reading resistivity tool receivers 206, or vice versa, each of the legacy sensors 202, the deep reading resistivity tool transmitter 204, and the deep reading resistivity tool receivers 206 include high quality factor (Q) passive filters between the tools 202, 204, and 206 and the single wire bus 208. To help illustrate, FIG. 2 depicts low pass filters 210 that are positioned on extreme ends of the single wire bus 208. The low pass filters 210 prevent the higher frequency signals from the deep reading resistivity tools 204 and 206 from extending beyond a portion of the single wire bus 208 at which multi-frequency communication is desirable. Accordingly, the high frequency tones provided by the deep reading resistivity tools 204 and 206 are filtered out from the single wire bus 208 before the single wire bus 208 reaches the legacy sensor 202A or the legacy sensor 202C. In this manner, legacy sensor communication between the legacy sensors 202A and 202C is achieved without interference from the high frequency tones of the deep reading resistivity tools 204 and 206. In an embodiment, the legacy sensors 202A and 202C include more than one legacy sensor 202.

Within a multi-frequency range of the single wire bus 208 (e.g., between the low pass filters 210), the deep reading resistivity tool transmitter 204, the deep reading resistivity tool receivers 206A and 206B, and the legacy sensors 202B each include filters to prevent interference from the high frequency signals or the low frequency signals at the deep reading resistivity tool transmitter 204, the deep reading resistivity tool receivers 206A and 206B, and the legacy sensors 202B. In this manner, the single wire bus 208 is able to carry both the high frequency signals and the low frequency signals in a single amplitude modulated signal, and the high frequency signals and the low frequency signals do not interfere with each other when received at the deep reading resistivity tools 204 and 206 or the legacy sensors 202. As illustrated, each of the legacy sensors 202B include low pass filters 210. The low pass filters 210, in an embodiment, are the same as the low pass filters 210 positioned at each end of the multi-frequency range of the single wire bus 208. The low pass filters 210 of the legacy sensors 202B allow the lower frequency signals from the legacy sensors 202 to be received at the legacy sensors 202B, and the low pass filters 210 block transmission of the higher frequency deep reading resistivity tool signals present on the single wire bus 208. In an embodiment, the low pass filters 210 of the legacy sensors 202B and the low pass filters 210 positioned at each end of the multi-frequency range of the single wire bus 208 may also be a high frequency blocking filter or a band stop filter that rejects the band of frequencies associated with the higher frequency deep reading resistivity tool signals.

The deep reading resistivity tool transmitter 204 and the deep reading resistivity tool receivers 206A and 206B each include high frequency pass filters 212 and high frequency blocking filters 214. The high frequency pass filters 212 allow the higher frequency deep reading resistivity tool signals to pass to the deep reading resistivity tool transmitter 204 and the deep reading resistivity tool receivers 206A and 206B. Additionally, to inject clean deep reading resistivity tool signals onto the single wire bus 208, the deep reading resistivity tool transmitter 204 and the deep reading resistivity tool receivers 206A and 206B include the high frequency blocking filters 214. The high frequency blocking filters 214 are shunted to ground and shunt any lower frequency noise that may be present in a deep reading resistivity tool signal applied to the single wire bus 208 from the deep reading resistivity tool transmitter 204 and/or the deep reading resistivity tool receivers 206A and 206B.

While the illustrated embodiment includes the two legacy sensors 202B, the deep reading resistivity tool transmitter 204, and the deep reading resistivity tool receivers 206A and 206B positioned along the multi-frequency range of the single wire bus 208, it is also contemplated that additional legacy sensors 202B, deep reading resistivity tool transmitters 204, and deep reading resistivity tool receivers 206A and 206B may be positioned along the multi-frequency range of the single wire bus 208. As a distance 216 between the deep reading resistivity tool transmitter 204 and the bottommost deep reading resistivity tool receiver 206B may be greater than 100 feet, there may be sufficient room along the multi-frequency range of the single wire bus 208 for several tools in addition to the downhole tools illustrated in FIG. 2.

In addition to facilitating communication between the deep reading resistivity tool transmitter 204 and the deep reading resistivity tool receivers 206A and 206B, which is known as downhole communication, one of the deep reading resistivity tool transmitter 204 or receivers 206A or 206B provides high frequency pulses across the single wire bus 208 to the remaining deep reading resistivity tools 204 and/or 206 of the BHA 110. The pulses are filtered out by the low pass filters 210 at the legacy sensors 202 and allowed to pass to the deep reading resistivity tool transmitter 204 and the deep reading resistivity tool receivers 206A and 206B through the high frequency pass filters 212. The pulses provide synchronized timing signals between the deep reading resistivity tool transmitter 204 and the deep reading resistivity tool receivers 206A and 206B such that the deep reading resistivity tool transmitter 204 and the deep reading resistivity tool receivers 206A and 206B are able to obtain synchronized sample measurements upon outputting or receiving the pulse signals. For example, a high frequency pulse supplied to the single wire bus 208 by the deep reading resistivity transmitter 204 provides a synchronized signal for analog to digital converter sampling at the deep reading resistivity tool transmitter 204 and the deep reading resistivity tool receivers 206A and 206B. Synchronization of the sample measurements enables an accurate comparison of the electromagnetic signal transmitted into the formation 112 by the deep reading resistivity tool transmitter 204 and the electromagnetic signals received from the formation 112 by the deep reading resistivity tool receivers 206A and 206B. The changes in the signal (e.g., a time shift, a change in amplitude, etc.) provide details about characteristics of the formation 112. The sample measurements may be stored within a memory located within each of the deep reading resistivity tool transmitter 204 and the deep reading resistivity tool receivers 206A and 206B and analyzed at the surface 120 upon removal of the BHA 110 from the wellbore 109. In an embodiment, the deep reading resistivity tools 204 and 206 may alternate between sampling using the pulse signals and transmitting data across the single wire bus 208. Accordingly, the physical layer added by transmitting data at a greater frequency than the legacy signals of the legacy sensors 202 enables sampling synchronization and data transmission from the deep reading resistivity tools 204 and 206.

While the deep resistivity tools 204 and 206 are described above using communication schemes at different frequencies from the legacy communication schemes, the deep resistivity tools 204 and 206 maintain communication capabilities using the legacy communication schemes. In an embodiment, a bus master 220 is able to receive data from both legacy signals injected onto the single wire bus 208 by the legacy sensors 202 and the deep reading resistivity signals injected onto the single wire bus 208 by the deep reading resistivity tools 204 and 206. The bus master 220 is then able to select data to send to a pulser 218. The pulser 218 is able to pulse the data received from the bus master 220 to the surface 120 using mud pulse telemetry or electromagnetic pulses, for example.

FIG. 3A is a chart 300 illustrating operation of the high frequency blocking filter 214. The chart 300 includes an abscissa 302 representing signal frequency and an ordinate 304 representing impedance of the high frequency blocking filter 214. A line 306 within the chart 300 provides an illustration of the change in impedance of the high frequency blocking filter 214 as the frequency increases. In this particular high frequency blocking filter 214, the impedance increases until the frequency reaches a tone of interest 307 established by the deep reading resistivity tool signal (e.g., 1 MHz). After passing the tone of interest 307, the impedance decreases toward zero as the frequency continues to increase. As illustrated, the impedance of the high frequency blocking filter 214 blocks transmission of the signal when the frequency is within a band surrounding the tone of interest because the high frequency blocking filter 214 is a 608 filter. The high frequency blocking filter 214 may be designed in such a manner that only a small range of frequencies are blocked, and, in operation, the deep reading resistivity tool signal is maintained within the small range of blocked frequencies. To limit the range of frequencies that are blocked, the high frequency blocking filter 214 is designed with a high quality (Q) factor. By way of example, the range of blocked frequencies may be approximately 1 MHz±10 kHz. In this manner, a large spectrum of usable frequencies are available along the single wire bus 208 for legacy signals that will not interfere with transmission of the deep reading resistivity tool signals.

FIG. 3B is a schematic diagram of the high frequency blocking filter 214. The high frequency blocking filter 214 includes a high quality inductor 310 in parallel with a high quality capacitor 312. The inductance value for the inductor 310 and the capacitance value for the capacitor 312 are selected to establish a high Q factor of the high frequency blocking filter 214 such that only a narrow range surrounding the tone of interest 307 for the deep reading resistivity tool signals is blocked. Further, the inductance value for the inductor 310 and the capacitance value for the capacitor 312 are selected to block the tone of interest of the deep reading resistivity tool signal (e.g., 1 MHz).

The high frequency blocking filter 214 may also be referred to as a notch filter, as the high frequency blocking filter 214 has a very narrow stopband due to the high Q characteristic of the high frequency blocking filter 214. While the high frequency blocking filter 214 is depicted in FIG. 2 on only the deep reading resistivity tool transmitter 204 and the deep reading resistivity tool receivers 206A and 206B, any of the low pass filters 210 of FIG. 2 may be substituted for the high frequency blocking filter 214 to establish a similar result. Additionally, the high frequency blocking filter 214 is capable of handling high DC currents (e.g., approximately 6 amperes), such that the high frequency blocking filter 212 has no effective impact on current carrying capabilities of a sub-bus that leads to the legacy sensors 202. Thus, the legacy sensors 202 are powered by the single wire bus 208 even though the power from the single wire bus 208 is filtered by the high frequency blocking filter 214.

FIG. 4A is a chart 400 illustrating operation of a high frequency pass filter 212. The chart 400 includes an abscissa 402 representing signal frequency and an ordinate 404 representing impedance of the high frequency pass filter 212. A line 406 within the chart 400 provides an illustration of the change in impedance of the high frequency pass filter 212 as the frequency increases. In the high frequency pass filter 212, the impedance is high at a low frequency and decreases until the frequency reaches the tone of interest 407 established by the deep reading resistivity tool signal (e.g., 1 MHz). As the line 406 approaches the tone of interest 407, the impedance approaches zero. After the frequency increases beyond the tone of interest 407, the impedance again increases. To illustrate, the impedance of the high frequency pass filter 212 provides a blocking operation when a frequency of a signal is not within a narrow frequency band surrounding the tone of interest 407, and the impedance of the high frequency pass filter 212 provides a pass operation when the frequency of the signal is within the narrow frequency band. The high frequency pass filter 212 may be designed in such a manner that only a small range of frequencies are passed, and the deep reading resistivity tool signal is maintained within the small range of passed frequencies. By way of example, the range of pass frequencies may be approximately 1 MHz±10 kHz. In this manner, a large spectrum of usable frequencies are available along the single wire bus 208 that will not interfere with the deep reading resistivity tool signals.

FIG. 4B is a schematic diagram of the high frequency pass filter 212. The high frequency pass filter 212 includes an inductor 410 in series with a capacitor 412. The inductance value for the inductor 410 and the capacitance value of the capacitor 412 are selected such that only a narrow range of frequencies surrounding the tone of interest 407 for the deep reading resistivity tool signals are passed through the high frequency pass filter 212. To achieve a similar passing range as the blocking range of the high frequency blocking filter 214, the inductance and capacitance values of the inductor 410 and the capacitor 412 are the same as values of the inductor 310 and the capacitor 312 of the blocking filter 214. The resulting filters 212 and 214 pass or block the same range of frequencies, respectively.

The filter 212 is a narrow bandpass filter. As with the high frequency blocking filter 214, having a narrow passband or a narrow stopband is beneficial to allow a greater range of frequencies on the single wire bus 208 for other sensors, as the deep reading resistivity tool signals occupy the narrow passband and stopbands of the filters 212 and 214.

Figure 5:
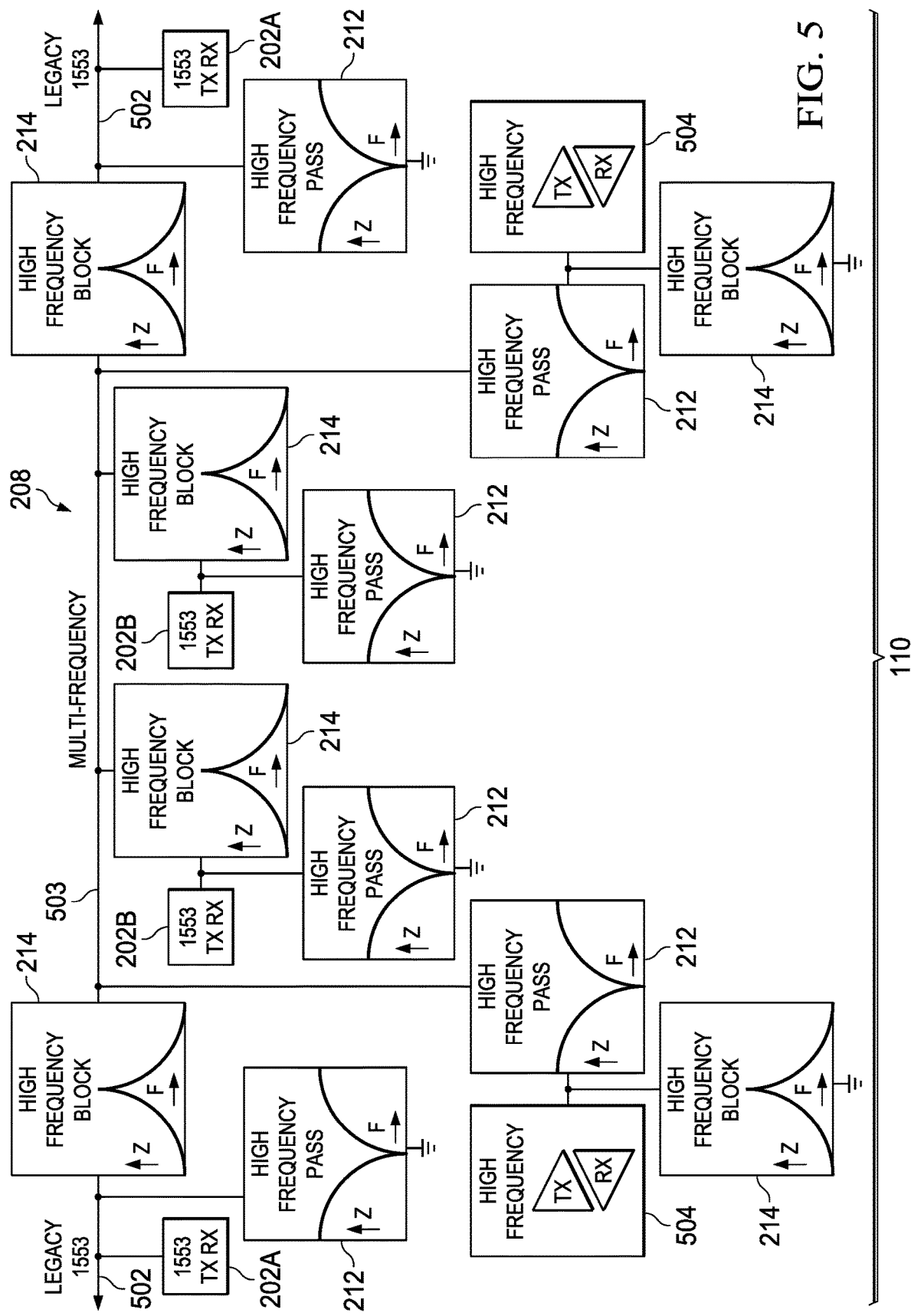
FIG. 5 is a schematic view of sensors coupled to a single wire bus of the bottom hole assembly of FIG. 2.

FIG. 5 is a schematic view of the legacy sensors 202 and deep reading resistivity tool transceivers 504 coupled to a single wire bus 208 of the BHA 110. The BHA 110 includes the legacy sensors 202A coupled to legacy portions 502 of the single wire bus 208. The legacy portions 502 of the single wire bus 208 are positioned at either end of the single wire bus 208 and are separated from a multi-frequency portion 503 of the single wire bus 208 by high frequency blocking filters 214. In the illustrated embodiment, the high frequency blocking filters 214 that separate the legacy portions 502 from the multi-frequency portion 503 of the single wire bus 208 may be replaced by the low pass filters 210, as discussed above with respect to FIG. 2. The low pass filters 210 may limit frequencies available for use on the legacy portion 502 of the single wire bus 208, but, when the legacy sensors 202A operate at a single frequency that is less than the tones of interest 307/407 of the deep reading resistivity tool transceivers 504, the low pass filters 210 are sufficient to block the higher frequency signals of the deep reading resistivity tool transceivers 504 from the legacy sensors 202A. Higher order filters to achieve a higher order response may also be implemented between the legacy portions 502 and the multi-frequency portion 503 of the single wire bus 208 by cascading additional high frequency blocking filters 214 in series with the illustrated high frequency blocking filters 214.

In the illustrated embodiment, high frequency pass filters 212 are also positioned shunted to ground along the legacy portion 502 of the single wire bus 208. These high frequency pass filters 212 provide a further mechanism to filter high frequency noise from the legacy portion 502 of the single wire bus 208. For example, the high frequency pass filter 212 shunts any remaining high frequency signals at the tone of interest 307/407 to ground. In this manner, the legacy portion 502 maintains lower frequency legacy signals while preventing any higher frequency signals from interfering with the lower frequency legacy signals.

Within the multi-frequency portion 503 of the single wire bus 208, FIG. 5 illustrates a pair of deep reading resistivity tool transceivers 504, which are included in place of the deep reading resistivity tool transmitter 204 and the deep reading resistivity tool receivers 206A and 206B illustrated in FIG. 2. The deep reading resistivity tool transceivers 504 each provide transmitter and receiver functions to the BHA 110, and the deep reading resistivity tool transceivers 504 use the higher frequency signals from the multi-frequency portion 503 of the single wire bus 208 for downhole communication and synchronization. Similar to the deep reading resistivity tool transmitter 204 and the deep reading resistivity tool receivers 206A and 206B of FIG. 2, the deep reading resistivity tool transceivers 504 each include high frequency pass filters 212 and high frequency blocking filters 214. The high frequency pass filters 212 allow the higher frequency deep reading resistivity tool signals to pass to the deep reading resistivity tool transceivers 504.

Higher order filters with a higher order response may also be implemented between the deep reading resistivity tool transceivers 504 and the single wire bus 208 by cascading additional high frequency pass filters 212 in series with the illustrated high frequency pass filter 212.

To inject clean deep reading resistivity tool signals onto the single wire bus 208, the deep reading resistivity tool transceivers 504 are coupled to the high frequency blocking filters 214 shunted to ground. The high frequency blocking filters 214 shunt to ground any lower frequency signals or noise that may be present in a deep reading resistivity tool signal applied to the single wire bus 208 from the deep reading resistivity tool transceivers 504. When receiving a high frequency signal from the single wire bus 208, the high frequency blocking filters 214 shunt to ground any remaining lower frequency noise that may be present in the deep reading resistivity tool signal after filtering by the high frequency pass filters 212.

Also included along the multi-frequency portion 503 of the single wire bus 208 are the legacy sensors 202B. As with the legacy sensors 202B depicted in FIG. 2, the legacy sensors 202B include a high frequency blocking filter 214 to prevent the higher frequency deep reading resistivity tool signals from the deep reading resistivity tool transceivers 504 from interfering with the lower frequency legacy signals at the legacy sensors 202B. The high frequency pass filter 212 coupled between the legacy sensors 202B and ground provide a path to shunt any high frequency noise in the legacy signal after filtering by the high frequency blocking filter 214.

In an embodiment, the deep reading resistivity tool transceiver 504, and the transmitter 204 and receivers 206A and 206B discussed above with respect to FIG. 2, operate by injecting electromagnetic signals into the formation 112 surrounding the BHA 110 and receiving the injected electromagnetic signals from the formation 112. By comparing the injected signal to the received signal, an operator is able to determine resistivity of the formation 112. The resistivity of the formation 112 provides an indication of characteristics of the formation 112. These characteristics are used by the operator to determine, for example, when the drill bit 114 has entered a pay zone of the formation 112. The transceivers 504 and/or the transmitter 204 and receiver 206 combination may perform a measurement operation of the formation 112 while the drill bit 114 is drilling into the formation 112 (e.g., in a logging while drilling (LWD) configuration), while the drilling system 100 is wiping the wellbore 109 (e.g., when the BHA 110 is run up or down the wellbore 109), while the BHA 110 is tripping out of the wellbore 109 to the surface 120, or during any other operation that provides an adequate platform for conducting the measurements with the BHA 110.

FIG. 6 is a flow chart of a method 600 for multi-frequency communication across the single wire bus 208. At block 602, a high frequency signal is injected onto the single wire bus 208 from the deep reading resistivity tool transmitter 204, the deep reading resistivity tool receivers 206, or the deep reading resistivity tool transceivers 504 via the high frequency pass filter 212. The high frequency pass filter 212 ensures that a high quality signal is injected onto the single wire bus 208 and that the high frequency signal is not impacted by temperature, other loads, or jitter introduced by other signals. The high frequency signal is used for downhole communication between the deep reading resistivity tool sensors 204, 206, and/or 504 in addition to downhole communication with the bus master 220. In an embodiment, the high frequency signals may also be transmitted across the single wire bus 208 to provide signals to synchronize sampling of the deep reading resistivity tool sensors 204, 206, and/or 504.

At block 604, which may occur simultaneously with block 602, legacy signals of a frequency lower than the high frequency signals of block 602 are injected onto the single wire bus 208 from the legacy sensors 202. The frequency of the legacy signals is an order of magnitude less than the higher frequency signal of the deep reading resistivity tool sensors 204, 206, and 504. For example, the legacy signals may be 200 kHz signals, while the higher frequency signals have a frequency of approximately 1 MHz. By maintaining the frequency levels an order of magnitude apart, a high Q passive filter is able to isolate the legacy signals from the higher frequency signals at the legacy sensors 202 and the deep reading resistivity tool sensors 204, 206, and/or 504.

As an example, at block 606, the higher frequency signals from the deep reading resistivity tool sensors 204, 206, and 504 are blocked from the legacy sensors 202. The higher frequency signals pass from the multi-frequency portion 503 of the single wire bus 208 to the legacy sensors 202 through the high frequency blocking filter 214 or through a low pass filter 210. The high frequency blocking filter 214 prevents frequencies within a range of the tone of interest of the higher frequency signals from passing to the legacy sensors 202. Similarly, the low pass filter 210 prevents frequencies above a specified range from passing to the legacy sensors 202. In this manner, the low pass filter 210 or the high frequency blocking filter 214 prevents the higher frequency signals from affecting the legacy signals at the legacy sensors 202.

In a similar manner, at block 608, legacy signals from the legacy sensors 202 are blocked at the deep reading resistivity tool sensors 204, 206, and/or 504. The legacy signals are blocked using a high frequency pass filter 212. The high frequency pass filter 212 allows passage of frequencies within a range of the tone of interest of the higher frequency signals provided by the deep reading resistivity tool sensors 204, 206, and 504. In this manner, only the higher frequency signals are received at the deep reading resistivity tool sensors 204, 206, and 504, and the legacy signals and any other signals with frequencies outside of the pass range of the high frequency pass filter 212 do not interfere with the transmission of the higher frequency signals to the deep reading resistivity tool sensors 204, 206, and 504.

With the high frequency signals blocked by the high frequency blocking filter 214 at the legacy sensors 202, the legacy signals are extracted from the single wire bus 208 by the legacy sensors 202 at block 610. Blocking the high frequency signals originating from the deep reading resistivity tool sensors 204, 206, and 504 limits the impact of noise on the legacy signals originating from the high frequency signals. In a similar manner, at block 612, the high frequency signals originating from the deep reading resistivity tool sensors 204, 206, and 504 are extracted from the single wire bus 208 by the deep reading resistivity tool sensors 204, 206, and/or 504. Because the high frequency pass filter 212 allows only the higher frequency signals from the deep reading resistivity tool sensors 204, 206, 504, and/or the pulser 218, the likelihood of noise on the higher frequency signals originating from the legacy signals is limited. For example, the high frequency pass filter 212 prevents the high frequency signal from being impacted by temperature, other loads on the single wire bus 208, or jitter introduced by other signals.

Using the method 600, multiple communication frequencies are available on the single wire bus 208 with inexpensive modifications to the single wire bus 208 and the legacy sensors 202. Further, as the high or low frequencies are filtered out of a signal on the single wire bus 208 before being extracted from the single wire bus 208 by the legacy sensors 202 or the deep reading resistivity tool sensors 204, 206, and 504, the signal frequencies not of interest to the legacy sensors 202 or the deep reading resistivity tool sensors 204, 206, and 504 are invisible. For example, jitter introduced by the high frequency signal onto the low frequency signal is avoided when the low frequency signal is extracted from the single wire bus 208 by the legacy sensor 202. Similarly, jitter introduced by the low frequency signal onto the high frequency signal is avoided when the high frequency signal is extracted from the single wire bus 208 by the deep reading resistivity tool sensors 204, 206, and 504.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowchart depicts a serial process, some of the steps/processes may be performed in parallel or out of sequence, or combined into a single step/process. The scope of the claims is intended to broadly cover the disclosed embodiments and any such modification. Further, the following clauses represent additional embodiments of the disclosure and should be considered within the scope of the disclosure:

Clause 1, a bottom hole assembly, comprising: a single wire bus; at least one legacy sensor coupled to the single wire bus; at least one communication sensor coupled to the single wire bus, wherein the at least one communication sensor is configured to inject a communication signal alternating between high frequency synchronization pulses and high frequency data signals onto the single wire bus, and a first communication frequency of the communication signal is at least an order of magnitude greater than a second communication frequency of a legacy signal of the at least one legacy sensor; a first high frequency pass filter coupled between the at least one communication sensor and the single wire bus, wherein the first high frequency pass filter is configured to pass the communication signal from the at least one communication sensor to the single wire bus; and a first high frequency blocking filter coupled between the at least one legacy sensor and the single wire bus, wherein the high frequency blocking filter is configured to block the communication signal from the at least one communication sensor from disturbing the legacy signal of the at least one legacy sensor.

Clause 2, the bottom hole assembly of clause 1, comprising: a second high frequency blocking filter coupled between the at least one communication sensor and ground, wherein the second high frequency blocking filter is configured to shunt any low frequency signals to ground to remove the low frequency signals from the communication signal; and a second high frequency pass filter coupled between the at least one legacy sensor and the ground, wherein the second high frequency pass filter is configured to shunt any remaining high frequency signals to ground to remove the remaining high frequency signals from the legacy signal.

Clause 3, the bottom hole assembly of clause 1 or 2, wherein the at least one communication sensor comprises a transceiver.

Clause 4, the bottom hole assembly of at least one of clauses 1-3, comprising a second high frequency pass filter coupled between a second communication sensor and the single wire bus, wherein the second high frequency pass filter is configured to pass a communication signal from the single wire bus to the second communication sensor.

Clause 5, the bottom hole assembly of at least one of clauses 1-4, comprising a second high frequency blocking filter and a third high frequency blocking filter coupled to the single wire bus at each end of the single wire bus.

Clause 6, the bottom hole assembly of at least one of clauses 1-5, wherein the first high frequency blocking filter comprises a first capacitor and a first inductor positioned in parallel with each other, and the first high frequency pass filter comprises a second capacitor and a second inductor positioned in series with each other.

Clause 7, the bottom hole assembly clauses 6, wherein the first capacitor and the second capacitor each comprise an equal capacitance value, and the first inductor and the second inductor each comprise an equal inductance value.

Clause 8, the bottom hole assembly of at least one of clauses 1-7, wherein the at least one legacy sensor comprises an accelerometer, a gyroscope, or a magnetometer.

Clause 9, the bottom hole assembly of at least one of clauses 1-8, wherein the at least one communication sensor is configured to measure resistivity of a formation surrounding the bottom hole assembly.

Clause 10, the bottom hole assembly of at least one of clauses 1-9, wherein the single wire bus is configured to receive the high frequency synchronization pulses from a first communication sensor of the at least one high frequency communication sensor, wherein the high frequency synchronization pulses are of the same frequency as the high frequency data signals, and wherein the high frequency synchronization pulses are used to synchronize the communication sensors coupled to the single wire bus without interfering with the legacy signal received at the legacy sensor.

Clause 11, a method for synchronizing a deep reading resistivity tool transmitter and a deep reading resistivity tool receiver coupled to a single wire bus, comprising: transmitting a first electromagnetic signal from the deep reading resistivity tool transmitter into a formation; receiving the first electromagnetic signal at the deep reading resistivity tool receiver from the formation; sampling the first electromagnetic signal from the deep reading resistivity tool transmitter at time intervals established by a high frequency pulse transmitted by the deep reading resistivity tool transmitter to the single wire bus; sampling the first electromagnetic signal from the deep reading resistivity tool receiver at the time intervals established by the high frequency pulse transmitted to the deep reading resistivity tool receiver from the single wire bus; and conducting legacy sensor communication using legacy sensors coupled to the single wire bus, wherein legacy signals provided to and from the legacy sensors are undisturbed by the high frequency pulse transmitted along the single wire bus.

Clause 12, the method of clause 11, wherein conducting the legacy sensor communication comprises filtering a multi-frequency signal from the single wire bus using a high frequency blocking filter to block transmission of the high frequency pulse to the legacy sensors.

Clause 13, the method of clause 11 or 12, wherein sampling the first electromagnetic signal from the deep reading resistivity tool receiver comprises: filtering a multi-frequency signal from the single wire bus using at least one high frequency pass filter to block transmission of the legacy signal to the deep reading resistivity tool transmitter and the deep reading resistivity tool receiver; receiving the high frequency pulse signal at the deep reading resistivity tool transmitter and the deep reading resistivity tool receiver; and storing samples of the first electromagnetic signal transmitted by the deep reading resistivity tool transmitter and received by the deep reading resistivity tool receiver when the deep reading resistivity tool transmitter and the deep reading resistivity tool receiver receive the high frequency pulse from the at least one high frequency pass filter.

Clause 14, the method of at least one of clause 11-13, wherein the high frequency pulse comprises a 1 MHz signal with low harmonic distortion.

Clause 15, the method of at least one of clauses 11-14, comprising communicating between the deep reading resistivity tool transmitter and the deep reading resistivity tool receiver using a high frequency data signal on the single wire bus, wherein the high frequency data signal comprises a same frequency as the high frequency pulse, and the high frequency data signal does not disturb the legacy sensor communication at the legacy sensors.

Clause 16, a method for downhole communication between at least two high frequency communication sensors coupled to a single wire bus, comprising: injecting an electrical communication signal from a first high frequency communication sensor of the at least two high frequency communication sensors onto the single wire bus of a bottom hole assembly within a wellbore; filtering out a legacy signal originating from a first legacy sensor of the bottom hole assembly from the single wire bus using a high frequency pass filter; receiving the electrical communication signal from the high frequency pass filter at a second high frequency communication sensor of the at least two high frequency communication sensors.

Clause 17, the method of clause 16, comprising: injecting the legacy signal from the first legacy sensor of the bottom hole assembly onto the single wire bus of the bottom hole assembly; filtering the electrical communication signal from the first high frequency communication sensor of the bottom hole assembly from the single wire bus using a high frequency blocking filter; receiving the legacy signal from the high frequency blocking filter at a second legacy sensor of the bottom hole assembly.

Clause 18, the method of clause 16 or 17, wherein the electrical communication signal has a frequency that is an order of magnitude greater than a frequency of the legacy signal.

Clause 19, the method of at least one of clauses 16-18, wherein filtering out the legacy signal comprises filtering a multi-frequency signal on the single wire bus by passing a signal that is within 10 kHz of a tone of interest of the high frequency pass filter.

Clause 20, the method of at least one of clauses 16-19, comprising: injecting a high frequency pulse onto the single wire bus; filtering out the high frequency pulse from the single wire bus using a high frequency blocking filter to pass the legacy signal to a second legacy sensor; filtering out the legacy signal from the single wire bus using a high frequency pass filter to pass the high frequency pulse to one of the at least two high frequency communication sensors.

While this specification provides specific details related to multi-frequency communications along a single wire bus, it may be appreciated that the list of components is illustrative only and is not intended to be exhaustive or limited to the forms disclosed. Other components related to the multi-frequency communications will be apparent to those of ordinary skill in the art without departing from the scope and spirit of the disclosure. Further, the scope of the claims is intended to broadly cover the disclosed components and any such components that are apparent to those of ordinary skill in the art.

It should be apparent from the foregoing disclosure of illustrative embodiments that significant advantages have been provided. The illustrative embodiments are not limited solely to the descriptions and illustrations included herein and are instead capable of various changes and modifications without departing from the spirit of the disclosure.

What is claimed is:

1. A bottom hole assembly, comprising:
a single wire bus;
at least one legacy sensor coupled to the single wire bus;
at least one communication sensor coupled to the single wire bus, wherein the at least one communication sensor is configured to inject a communication signal alternating between high frequency synchronization pulses and high frequency data signals onto the single wire bus, and a first communication frequency of the communication signal is at least an order of magnitude greater than a second communication frequency of a legacy signal of the at least one legacy sensor;
a first high frequency pass filter coupled between the at least one communication sensor and the single wire bus, wherein the first high frequency pass filter is configured to pass the communication signal from the at least one communication sensor to the single wire bus; and
a first high frequency blocking filter coupled between the at least one legacy sensor and the single wire bus, wherein the high frequency blocking filter is configured to block the communication signal from the at least one communication sensor from disturbing the legacy signal of the at least one legacy sensor.

2. The bottom hole assembly of claim 1, comprising:
a second high frequency blocking filter coupled between the at least one communication sensor and ground, wherein the second high frequency blocking filter is configured to shunt any low frequency signals to ground to remove the low frequency signals from the communication signal; and
a second high frequency pass filter coupled between the at least one legacy sensor and the ground, wherein the second high frequency pass filter is configured to shunt any remaining high frequency signals to ground to remove the remaining high frequency signals from the legacy signal.

3. The bottom hole assembly of claim 1, wherein the at least one communication sensor comprises a transceiver.

4. The bottom hole assembly of claim 1, comprising a second high frequency pass filter coupled between a second communication sensor and the single wire bus, wherein the second high frequency pass filter is configured to pass the communication signal from the single wire bus to the second communication sensor.

5. The bottom hole assembly of claim 1, comprising a second high frequency blocking filter and a third high frequency blocking filter coupled to the single wire bus at each end of the single wire bus.

6. The bottom hole assembly of claim 1, wherein the first high frequency blocking filter comprises a first capacitor and a first inductor positioned in parallel with each other, and the first high frequency pass filter comprises a second capacitor and a second inductor positioned in series with each other.

7. The bottom hole assembly of claim 6, wherein the first capacitor and the second capacitor each comprise an equal capacitance value, and the first inductor and the second inductor each comprise an equal inductance value.

8. The bottom hole assembly of claim 1, wherein the at least one legacy sensor comprises an accelerometer, a gyroscope, or a magnetometer.

9. The bottom hole assembly of claim 1, wherein the at least one communication sensor is configured to measure resistivity of a formation surrounding the bottom hole assembly.

10. The bottom hole assembly of claim 1, wherein the single wire bus is configured to receive the high frequency synchronization pulses from a first communication sensor of the at least one communication sensor, wherein the high frequency synchronization pulses are of a same frequency as the high frequency data signals, and wherein the high frequency synchronization pulses are used to synchronize the first communication sensor coupled to the single wire bus without interfering with the legacy signal.

11. A method for downhole communication between at least two high frequency communication sensors coupled to a single wire bus, comprising:
    injecting an electrical communication signal from a first high frequency communication sensor of the at least two high frequency communication sensors onto the single wire bus of a bottom hole assembly within a wellbore;
    filtering out a legacy signal originating from a first legacy sensor of the bottom hole assembly from the single wire bus using a high frequency pass filter;
    receiving the electrical communication signal from the high frequency pass filter at a second high frequency communication sensor of the at least two high frequency communication sensors.

12. The method of claim 11, comprising:
    injecting the legacy signal from the first legacy sensor of the bottom hole assembly onto the single wire bus of the bottom hole assembly;
    filtering the electrical communication signal from the first high frequency communication sensor of the bottom hole assembly from the single wire bus using a high frequency blocking filter;
    receiving the legacy signal from the high frequency blocking filter at a second legacy sensor of the bottom hole assembly.

13. The method of claim 11, wherein the electrical communication signal has a frequency that is an order of magnitude greater than a frequency of the legacy signal.

14. The method of claim 11, wherein filtering out the legacy signal comprises filtering a multi-frequency signal on the single wire bus by passing only a signal with a frequency that is within 10 kHz of a tone of interest of the high frequency pass filter.

15. The method of claim 11, comprising:
    injecting a high frequency pulse onto the single wire bus;
    filtering out the high frequency pulse from the single wire bus using a high frequency blocking filter to pass the legacy signal to a second legacy sensor;
    filtering out the legacy signal from the single wire bus using a high frequency pass filter to pass the high frequency pulse to one of the at least two high frequency communication sensors.

* * * * *